No. 867,121.
PATENTED SEPT. 24, 1907.
J. A. FRENIER.
MECHANICAL MOVEMENT.
APPLICATION FILED APR. 15, 1907.
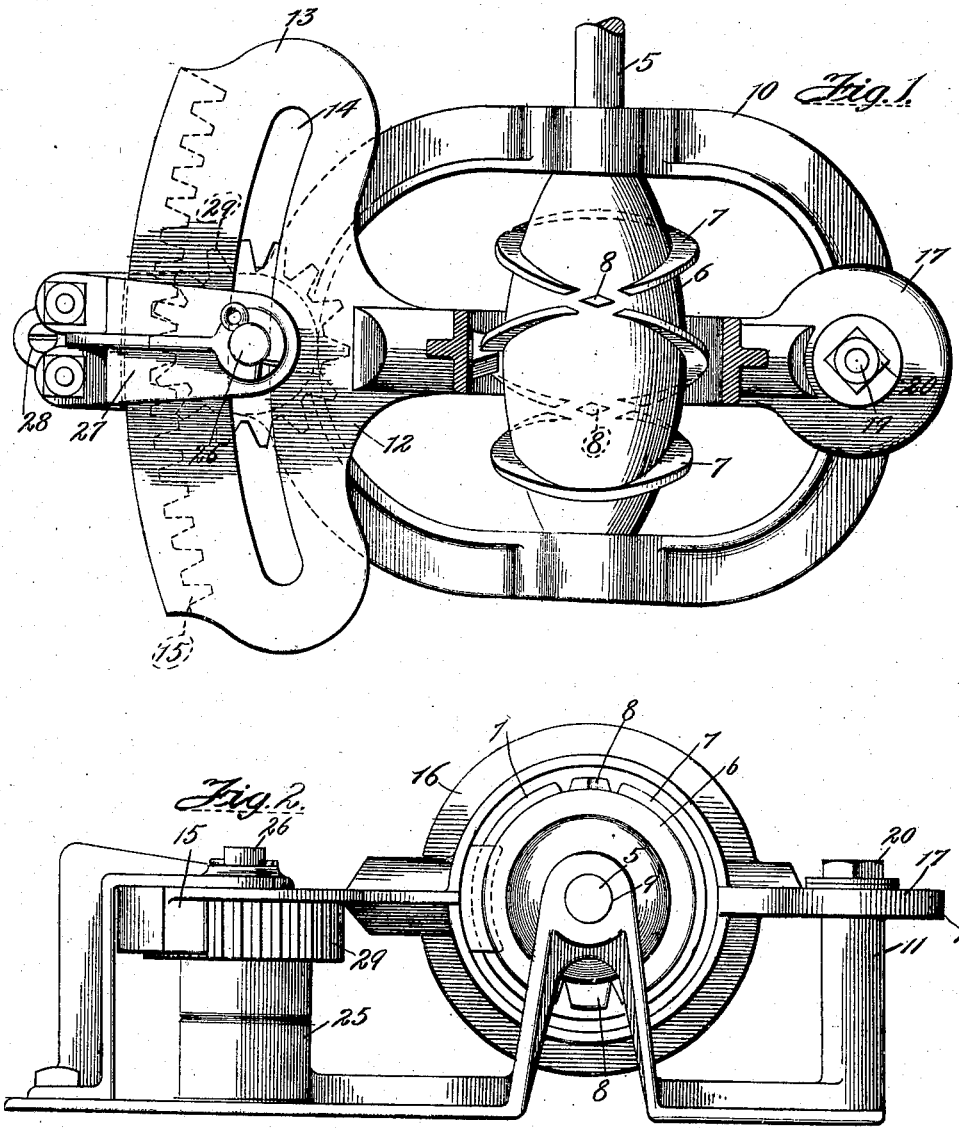

UNITED STATES PATENT OFFICE.

JOSEPH A. FRENIER, OF DAVENPORT, IOWA.

MECHANICAL MOVEMENT.

No. 867,121.  Specification of Letters Patent.  Patented Sept. 24, 1907.

Application filed April 15, 1907. Serial No. 368,157.

*To all whom it may concern:*

Be it known that I, JOSEPH A. FRENIER, a citizen of the United States of America, and a resident of Davenport, Iowa, have invented a certain new and useful Improvement in Mechanical Movements, of which the following is a specification.

My invention consists in a highly effective mechanical movement adapted for conversion of rotary motion into reciprocating or oscillatory movement.

The object of my invention is the provision of an improved and highly efficient mechanical movement of the foregoing general character.

A special object of my invention is the provision of an improved construction and arrangement whereby a flanged hub may be employed for converting the continuous rotation of one shaft into a reciprocating movement on the part of another member or shaft, and the provision of an improved construction and arrangement whereby such hub and rack and pinion device may be combined and employed in relation to each other for the above purpose.

A further object is the provision of a cheap and durable article that is not liable to get out of order, and one that is especially adapted for use in washing machines.

These and such other objects as may hereinafter appear, are attained by my device, embodiments of which are illustrated in the accompanying drawings, in which Figure 1 represents a top plan view of my device. Fig. 2 represents a side elevation of Fig. 1. Fig. 3 is a view partly in section, and showing the operation of the shoe or guide. Fig. 4 is a sectional view on the line 4—4 of Fig. 3, looking in the direction indicated by the arrows.

As thus illustrated, my invention comprises a shaft 5, upon which is mounted a hub 6. This hub is provided with a circumferential series of flanges 7—7, extending about the hub, and crossing each other at points 8—8 of the double figure 8. This shaft and hub is mounted in bearings 9 on the frame 10. The frame preferably extends rearwardly and upwardly, forming a support 11. An oscillating rack 12 comprising a plate 13, a curved slot 14, and depending toothed flange 15, a yoke portion 16, and end portion 17, is pivotally seated on the top of the support 11. This end or bearing piece 17 is provided with a circumferential flange 18 adapted to fit over the top of the support 11, and is secured in place by means of a bolt 19 passing through the support and bearing piece, and held in place by nuts 20. The circular yoke 16 is provided on the side farthest from the pivotal point of the rack with a recess 21 within which is movably seated the shank 22 of the shoe 23.

The face of the shoe 23 is slotted, as shown at 24, and within this slot is seated the circumferential flange 7. The shank of the shoe is free to revolve in the recess, so that the angle of inclination of the face of the shoe may adapt itself to the angle of the circumferential flange 7. A collar 25 is formed on the frame under the plate 13, through which extends a shaft 26. This shaft extends upwardly through an arm 27 bolted to the base of the frame at 28. A pinion wheel 29 is rigidly secured to this shaft beneath the plate, the teeth of which are in operative engagement with the rack 15. It will thus be seen that as the shaft 5 carrying the hub 6 is revolved, the flange 7 passes through the slot 24. The shoe is free to adapt itself to the angular position of the flange, but is carried longitudinally by the revolution carrying with it the oscillating rack on the bolt 19 as a pivot. When the rack has traveled to one extreme end of the hub, the continuous revolution of the shaft in the same direction causes the rack to pass backwardly over the same path, thus transforming the continuous rotary motion of the shaft into a reciprocating motion of the rack. As the teeth 15 of the rack engage the pinion 29, the reciprocating motion of the rack is directly transmitted to the shaft 26, the shaft revolving in one direction as the rack travels to its extreme limit, and then in the opposite direction as the rack returns over the same path. This converts the continuous rotary motion of the shaft 5 into a reciprocatory rotary motion of the shaft 26, and consequently to any appliance that may be attached to the base of the shaft, such, for instance, as a dasher of a churn or head of a washing machine. It will be noted that the shoe 23 is located as far from the pivotal point as possible, in the horizontal plane of the latter. This method gives greater leverage, and also reduces the distance between the point of transmission on the hub and the second shaft, thus preventing to a great degree torsional strain on the parts, while at the same time obtaining a maximum power with the least expenditure of energy. The location of the shoe, it will be seen, is very advantageous, as if the shoe were located either above or below the plane of the rack, greater torsional strain would result, and a greater degree of friction. The mechanism comprises few parts, none of which are small or intricate, and there is little danger of disarrangement or breakage of the parts, while at the same time the device may be easily assembled and disassembled when desired. The action of the machine is direct and positive, and is very efficient and durable.

It is evident that the construction may be varied so that parallel flanges on the hub may be substituted for the single flange, in which case the shoe would travel in the groove between the flanges. Or the groove or track may be formed in the face of the hub itself, and the shoe adapted to travel therein.

I claim:

1. The combination with a rotary shaft, terminating in a hub, a continuous series of circumferential flanges on said hub, a frame supporting said shaft, an oscillatory rack in operative relation to said hub, an operating shaft in operative relation thereto, and means for converting the continuous rotary motion of said hub into a reciprocatory motion of said operating shaft, said rack being pivotally secured on the opposite side of said hub from the rack portion.

2. The combination with a rotary shaft terminating in a hub, a continuous series of circumferential flanges on said hub, a frame supporting said shaft, an oscillatory rack in operative relation to said hub, an operating shaft in operative relation thereto, and means for converting the continuous rotary motion of said hub into a reciprocatory motion of said operating shaft, said rack being pivotally secured on the opposite side of said hub from the rack portion in the plane of the center of the hub.

3. The combination with a rotary shaft terminating in a hub, a continuous series of circumferential flanges on said hub, a frame supporting said shaft, an oscillatory rack in operative relation to said hub, comprising a slotted end plate provided with curved rack teeth, a central yoke, and a pivotal end, an operating shaft and pinion in operative relation with said rack, and means for converting the continuous rotary motion of said hub into a reciprocatory motion of said operating shaft.

4. The combination with a rotary shaft terminating in a hub, a continuous series of circumferential flanges on said hub, a frame supporting said shaft, an oscillatory rack in operative relation to said hub, comprising a slotted end plate provided with curved rack teeth, a central yoke and a pivotal end, an operating shaft and pinion in operative relation with said rack, and means for converting the continuous rotary motion of said hub into a reciprocatory motion of said operating shaft, said means comprising a shoe pivotally secured to said yoke and adapted to remain in operative engagement with said circumferential flange.

5. The combination with a horizontal rotary shaft terminating in a hub provided with driving means, a frame supporting said shaft, an oscillatory rack in operative relation to said hub, comprising a slotted end plate provided with curved rack teeth, a central yoke and a pivotal end, an operating shaft and pinion in operative relation with said rack, and means for converting the continuous rotary motion of said hub into a reciprocatory motion of said operating shaft, said means comprising a shoe pivotally secured to said yoke and adapted to remain in operative engagement with said hub.

Signed by me at Davenport, Iowa, this 11th day of April, 1907.

JOSEPH A. FRENIER.

Witnesses:
C. EMORY HARRISON,
J. C. HALL.